Jan. 22, 1924. 1,481,543
J. EKE
CONVERTIBLE VEHICLE BODY CONSTRUCTION
Filed Jan. 19, 1922  3 Sheets-Sheet 1
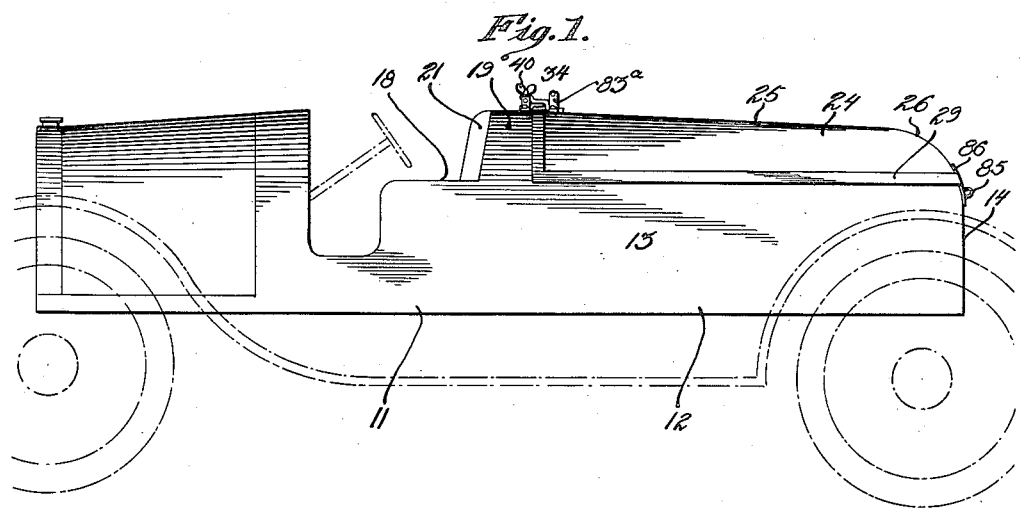
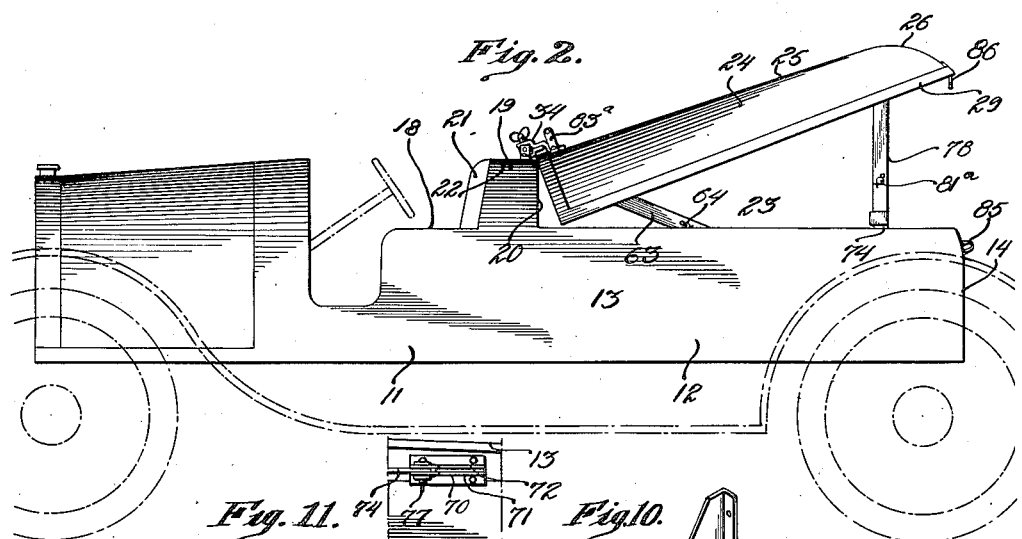
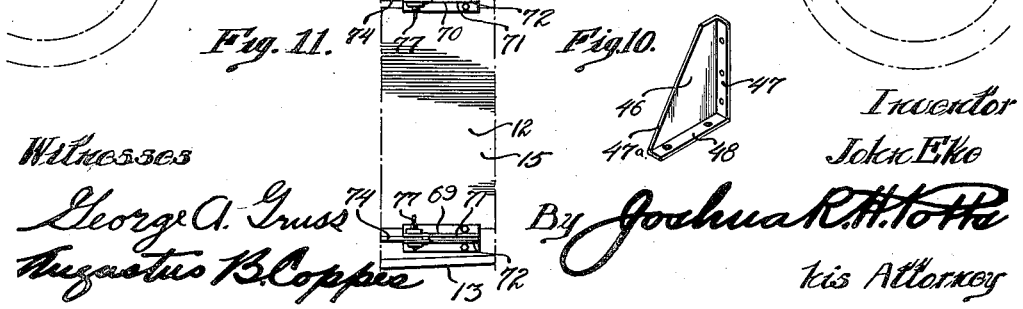

Jan. 22, 1924.

J. EKE 1,481,543

CONVERTIBLE VEHICLE BODY CONSTRUCTION

Filed Jan. 19, 1922   3 Sheets-Sheet 2

Jan. 22, 1924. 1,481,543
J. EKE
CONVERTIBLE VEHICLE BODY CONSTRUCTION
Filed Jan. 19, 1922 3 Sheets-Sheet 3
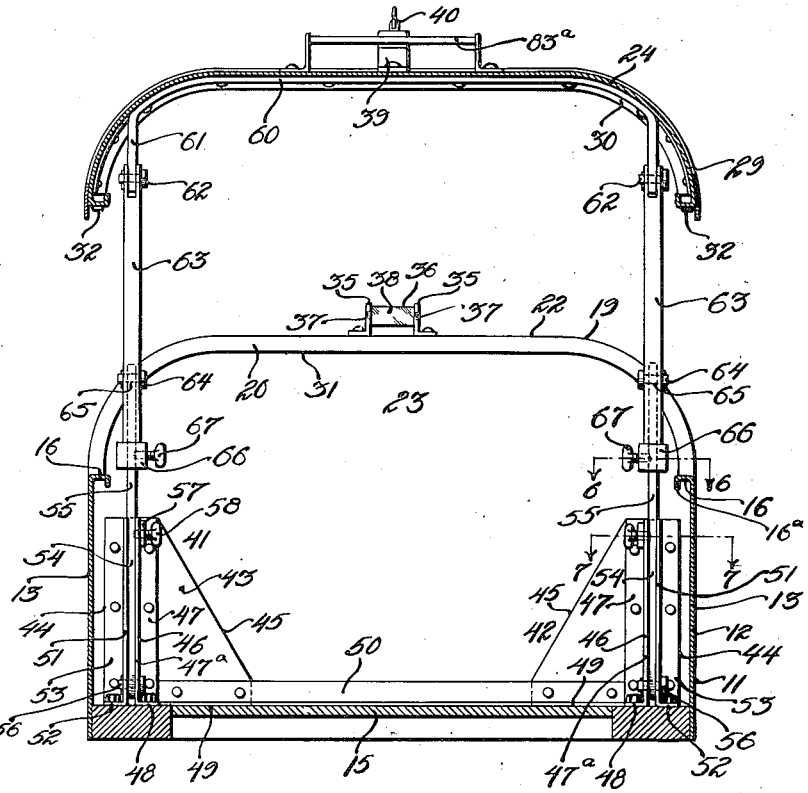
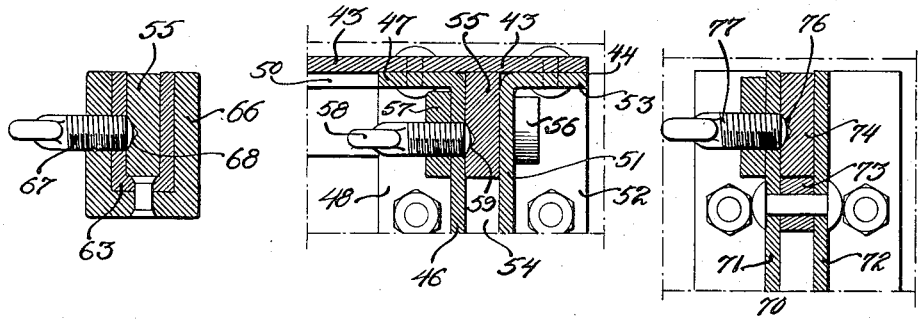

Patented Jan. 22, 1924.

1,481,543

UNITED STATES PATENT OFFICE.

JOHN EKE, OF PHILADELPHIA, PENNSYLVANIA.

CONVERTIBLE VEHICLE BODY CONSTRUCTION.

Application filed January 19, 1922. Serial No. 530,254.

*To all whom it may concern:*

Be it known that I, JOHN EKE, a citizen of the United States, residing at Philadelphia, in the county of Philadelphia and State of Pennsylvania, have invented certain new and useful Improvements in Convertible Vehicle Body Constructions, of which the following is a specification.

One object of my invention is to provide an improved construction for vehicle bodies by the use of which a vehicle can be used for hauling purposes and will serve as a truck; the arrangement being such that the same body can be made to have the appearance of a sport or pleasure car and for this reason my invention is of particular advantage for use in the construction of automobiles enabling a person to have a vehicle which can be used for hauling purposes and at the same time can enjoy the use of the automobile as a sport or pleasure car without having the unsightly appearance of a truck.

Another object is to make my improved vehicle body of a strong and durable formation which can be readily manufactured.

These objects, and other advantageous ends which will be described hereinafter, I attain in the following manner, reference being had to the accompanying drawings in which—

Figure 4:
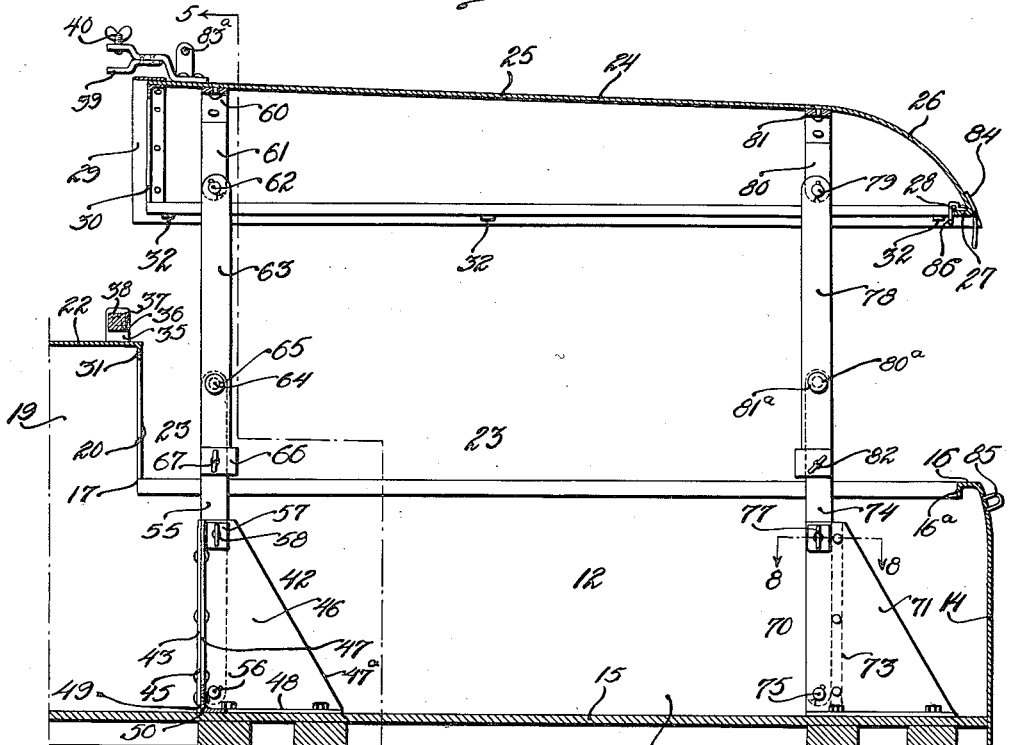
Figure 3:
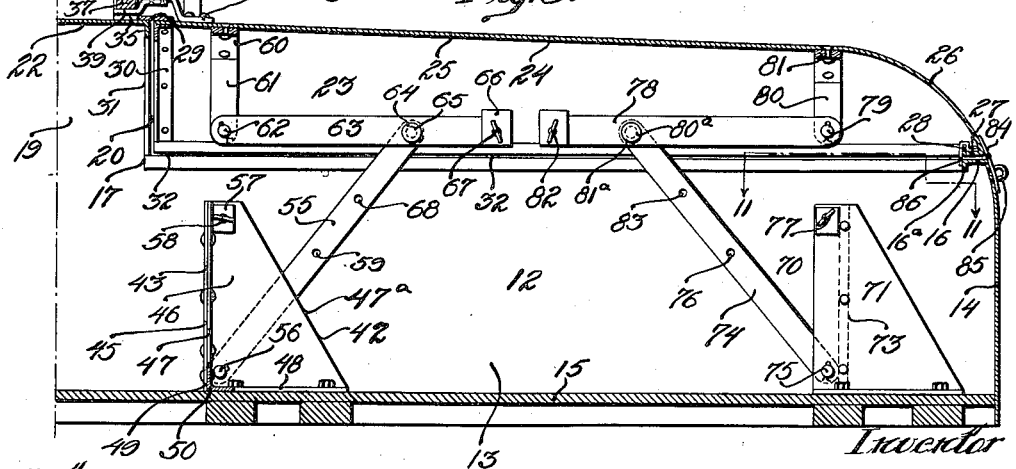

Figure 1 is a side elevation showing a vehicle body such for example as an automobile vehicle body illustrating the same with the cover in a position producing the appearance of a sport or pleasure car body, Figure 2 is a view of the same general character as that shown in Figure 1 illustrating the same with the cover swung into an inclined position and supported in said position enabling articles to be inserted within or removed from the hollow portion of the body, Figure 3 is a central longitudinal sectional elevation of a part of the body portion with the cover in its closed position, Figure 4 is a view of the same general character as that illustrated in Figure 3 with the cover raised so as to occupy a position substantially horizontal for enabling the hauling of articles of greater height or bulk than possible with the cover in the position shown in Figure 2, Figure 5 is a section taken on the line 5—5 of Figure 4, Figure 6 is an enlarged fragmentary section taken on the line 6—6 of Figure 5, Figure 7 is an enlarged fragmentary section taken on the line 7—7 of Figure 5, Figure 8 is an enlarged fragmentary section taken on the line 8—8 of Figure 4, Figures 9 and 10 are perspective views of a link bar and a bracing plate respectively, which form a part of my invention, and Figure 11 is a fragmentary sectional plan view taken on the line 11—11 of Figure 3.

Referring to the drawings, 11 represents an automobile body made in accordance with my invention including a hollow rear portion 12 which is preferably made of pressed or formed sheet metal including upright sides 13 and a rear or tail portion 14. The same can be provided with any suitable bottom 15. The upper edge portion of the sides 13 and rear 14 is preferably bent inward to provide a top flange 16 and a depending inner flange 16$^a$. This flange extends from the rear 14 to a position indicated at 17 immediately to the rear of the driver's seat 18. The body includes a portion 19 extending upward above the flanges 16 and 16$^a$ to provide a rear edge or wall 20 preferably at right angles to the flange portions at the sides of the rear portion 12 and this portion 19 provides a suitable support for the back 21 of the driver's seat. The top 22 of the portion 19 is preferably formed integral with the sides of said portion 19 so as to blend smoothly with the outer surfaces of the sides 13 and by providing the wall 20 and the upper flanged edges of the sides 13 and rear 14, a cut-out or space 23 is provided which is adapted to be enclosed by a cover 24 when the latter is in a lowered position such for example as shown in Figures 1 and 3; said cover having its top 25 preferably slightly slanting from the level of the top 22 of the portion 19 rearwardly and being curved at 26 adjacent its rear so as to register neatly with the upper portion of the rear 14 and with the flanged top edges of the sides 13 to the rear of the wall 20. This cover 24 can be formed out of sheet metal by pressing the same into the shape illustrated and is preferably provided with an inwardly extending flange 27 of substantially similar character to the flange 16 of the hollow rear 12 and from the flange 27 extends an upwardly projecting flange 28. The flanges serve to reinforce the cover and hollow rear portion and also serve to provide a neat parting line between the cover and the hollow rear portion 12 of the body.

I also preferably provide a lap 29 which may be made of strip sheet metal forming a projection at the edges of the cover 24 so that when the cover is lowered said strip facing will extend slightly over the hollow rear 12 and also over the top 22 and parting produced between the wall 20 and the front portion of the cover. I also preferably provide the cover 24 with an inner angle 30 which, when the cover is closed, is opposed to the inturned flange 31 which provides the wall 20. In addition to this, I also preferably provide resilient cushion pads 32 which may be made of rubber and secured to the flange 27 of the cover so as to rest on the flange 16 of the hollow rear portion 12 of the body.

I provide a hinge 34; said hinge including brackets 35 which are spaced apart and secured to the top 22 of the portion 19. A pivot member 36 has trunnions 37 pivotally supported in the brackets 35 and a portion 38 which is made of square or other angular cross section so as to be embraced by a yoke 39 which also forms a part of the hinge. This yoke 39 is secured to the top of the cover 24 and normally embraces the portion 38 of the pivot member 36.

A clamping or binding screw 40 extends within a tapped hole in the yoke 39 and jams against the portion 38 of the pivot member 36 so as to secure the yoke to the pivot member 36. Thus when the clamp screw 40 is screwed into engagement with the pivot member, the cover 24 can be swung on the axis of the pivot member as a pivot into a position shown in Figure 2. However, it will be noted that when the screw 40 is loosened and the cover is moved slightly to the rear that the yoke can be detached from the pivot member and the entire cover 24 can be bodily lifted into the position shown in Figure 4.

To allow for this latter movement of the cover and to support the cover in said elevated position, I provide the following construction and it will be noted that a part of said following construction also serves to support the cover in the position illustrated in Figure 2.

Two standards 41 and 42 are positioned within the hollow rear 12 of the body; said standards being similarly constructed and each including upright bracing plates 43 which flare downward from upright edges 44 so as to produce inclined edges 45 which converge toward each other as shown in Figure 5. These plates 43 extend transversely of the length of the body and other bracing plates 46 have their front edges bent as shown at 47 and secured to the bracing plates 43 preferably by rivets; the bracing plates 46 having rearwardly inclined edges 47a and bottom flanges 48 which are secured to the bottom of the hollow rear 12. The bracing plates 43 have wide bottom portions 49 which are positioned in the bottom of the hollow rear 12 and a tie bar in the form of an angle 50 secures the bracing plates 43 together. Other bracing plates 51, which are formed similarly to the plates 46, are spaced from said plates 46 and have flanges 52 and 53 which are secured to the bottom of the body and also to the bracing plates 43. Thus said plates 46 and 51 provide spaces 54 for pivotal supporting bars 55; said supporting bars being pivoted at 56 to the plates 46 and 51 adjacent the bottoms thereof so that said supporting bars 55 can be swung within the spaces 54; the plates 46 and 51 preventing lateral movement of the supporting bars 55.

These supporting bars 55 are of such length that when moved into upright positions they will have portions projecting above said standards and when in said upright positions, the forward edges of the bars 55 can engage the plates 43 in a manner shown in Figure 7. The plates 46 are preferably reinforced by pieces 57 as clearly shown in Figure 7 and said plates and pieces 57 are provided with tapped holes in which securing screws 58 fit; said securing screws being adapted to register with and project into recesses 59 in the bars 55 when the latter are in their upright positions as shown in Figures 5 and 7. The cover 24 has secured thereto a yoke supporting member 60 which has depending end portions 61 pivotally connected at 62 to link bars 63. These link bars, as illustrated in Figure 9, are of channel shape and pivot members 64 extend through holes 65 in the link bars and through the outer ends of the supporting bars 55. The holes 65 of the link bars are spaced inwardly from the end portions 66 and said end portions have clamping screws 67 therein for engagement within recesses 68 in the supporting bars 55; it being noted that said supporting bars are of such width as to swing between the sides of the link bars 63 when the link bars and supporting bars 55 are in their upright positions as shown in Figures 4 and 5. Thus the clamping screws 58 and 67 serve to hold the supporting bars 55 and the link bars 63 in their upright positions.

Two other standards 69 and 70 are supported on the bottom of the hollow rear portion 12; said standards being similarly constructed and each including side plates 71 and 72 which are spaced apart; said side plates having flanges on their bottoms to allow the securing thereof to the bottom 15 of the hollow portion 12. A spacing and abutting strip 73 is secured between the plates 71 and 72 of each of the standards 69 and 70 and form abutments for supporting bars 74 which are pivotally mounted at 75 upon the plates 71 and 72. These supporting bars 74 are constructed similar to the supporting bars 55 and have recesses 76 into which clamping screws 77 extend; said clamping screws being positioned within tapped holes in the plates 71 as clearly shown in Figure 8. The abutting bars 73 are positioned to the rear of the supporting bars 55 when the latter are in their upright positions.

Link bars 78 are pivotally connected at 79 to depending portions 80 of a yoke member 81; said yoke member being constructed substantially similar to the yoke member 60 and secured to the inner surface of the cover 24. These link bars 78 are of similar construction to the link bars 63 and have holes 80$^a$ through which pivot pins 81$^a$ extend; said pivot pins also passing through the outer ends of the supporting bars 74. The lower ends of the link bars 78 are provided with clamping screws 82 adapted to engage within recesses 83 in the supporting bars 74 when the parts are in the position shown is Figures 4 and 5. It will be noted that when the supporting bars 74 and link bars 78 are in their upright positions with the clamping screws 77 and 82 tightened that the structure will support the rear end of the cover 24. Thus, for example, if the cover is swung into the position shown in Figure 2 while the hinge is connected, said cover can be supported in said position by the tightening of the clamping screws 77 and 82.

If, for example, it is desired to completely raise the cover into the position shown in Figure 4, the clamping screw 40 of the hinge can be loosened and the entire body can be raised; such action being facilitated by the provision of a handle 83$^a$ on the cover. After the cover has been entirely raised the clamping screws 58 and 67 can be tightened and the cover will be locked in its raised position.

For the purpose of locking the rear end of the cover to the portion 12 of the body, I have provided the cover with a hinged hasp 84 adapted to engage over a staple keeper 85 and any suitable lock can be inserted through the keeper. Furthermore I preferably provide a depending lip 86 which is secured to the flanges 27 and 28 of the cover for engagement with the inner flange 16$^a$ of the portion 12 so as to hold the cover to further guard against movement of the cover relatively to the portion 12 during vibration caused by the running of the vehicle.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a vehicle, a body providing an opening; a cover for the opening; supporting bars pivoted to the body; link bars pivoted, between their ends, to the supporting bars and having one end pivoted to the cover, and means on the other end for clamping them to the supporting bars.

2. In a vehicle, a body providing an opening; a cover for the opening; supporting bars pivoted to the body; channel-shaped link bars pivoted between their ends to the supporting bars and having one end pivoted to the cover, and means on the other end for clamping them to the supporting bars.

3. In a vehicle, a body providing an opening; a cover for the opening; supporting bars pivoted to the body; link bars pivoted between their ends to the supporting bars and having one end pivoted to the cover; means on the other end for clamping them to the supporting bars, and means for clamping the supporting bars to the body.

4. In a vehicle, a body providing an opening and having an inwardly bent flange around its edge; a cover for the opening having an inwardly bent flange around its edge; cushioning means between the flanges, and means movably connected to the body and cover allowing the cover to be entirely raised and supported in a raised position.

5. In a vehicle, a hollow body having an opening; a cover for closing said opening; standards supported within said body; supporting bars pivotally connected to said standard; link bars pivotally connected to said supporting bars and to said cover; and means for securing said link bars against pivotal movement relatively to said supporting bars and standards, said link bars being made of channel shape to receive portions of said supporting bars; substantially as described.

6. In a vehicle, standards including plates spaced apart; a cover; supporting bars pivotally connected between said plates; link bars pivotally connected to said supporting bars and to said cover; clamping means for securing said link bars to said supporting bars; and clamping means for securing said supporting bars to said plates; substantially as described.

7. In a vehicle, standards including plates spaced apart; a cover; supporting bars pivotally connected between said plates; link bars pivotally connected to said supporting bars and to said cover; clamping means for securing said link bars to said supporting bars; and clamping means for securing said supporting bars to said plates, said link bars being of channel shape to receive portions of the supporting bars; substantially as described.

8. In a vehicle, a body providing an opening and having a portion extending above the level of the opening; a cover for closing the opening; a detachable hinge connecting the cover with the extending portion of the body; means movably connected to said body and cover allowing one or both ends of said cover to be entirely raised and supported in a raised position, and means for clamping the movably connected means in a supporting position.

In testimony whereof I have signed my name to this specification in the presence of two subscribing witnesses.

JOHN EKE.

Witnesses:
 ELIZABETH GARBE,
 CHAS. E. POTTS.